United States Patent
Pounds et al.

(10) Patent No.: US 11,680,860 B2
(45) Date of Patent: Jun. 20, 2023

(54) COMPACT LOAD CELLS

(71) Applicant: THE UNIVERSITY OF QUEENSLAND, Brisbane (AU)

(72) Inventors: Pauline Pounds, St Lucia (AU); Edwin Davis, St Lucia (AU); Michael Bruenig, Upper Brookfield (AU)

(73) Assignee: THE UNIVERSITY OF QUEENSLAND, St Lucia (AU)

( * ) Notice: Subject to any disclaimer, the term of this patent is extended or adjusted under 35 U.S.C. 154(b) by 0 days.

(21) Appl. No.: 16/463,110

(22) PCT Filed: Nov. 22, 2017

(86) PCT No.: PCT/AU2017/051282
§ 371 (c)(1),
(2) Date: May 22, 2019

(87) PCT Pub. No.: WO2018/094454
PCT Pub. Date: May 31, 2018

(65) Prior Publication Data
US 2019/0285493 A1    Sep. 19, 2019

(30) Foreign Application Priority Data

Nov. 24, 2016    (AU) .................... 2016904834

(51) Int. Cl.
*G01L 5/16* (2020.01)
*G01L 5/13* (2006.01)

(52) U.S. Cl.
CPC ............. *G01L 5/133* (2013.01); *G01L 5/16* (2013.01)

(58) Field of Classification Search
CPC . G01L 5/226; G01L 5/228; G01L 5/16; G01L 5/161; G01L 1/2293; G01L 5/162
See application file for complete search history.

(56) References Cited

U.S. PATENT DOCUMENTS 3,938,762 A * 2/1976 Murphy ............... B64C 27/001
                                              244/17.13
4,178,799 A * 12/1979 Schmieder ............ G01L 5/226
                                               73/862.045

(Continued)

OTHER PUBLICATIONS

International Search Report for PCT/AU2017/051282, dated Feb. 23, 2018, 4 pages.

(Continued)

*Primary Examiner* — Tran M. Tran
(74) *Attorney, Agent, or Firm* — Nixon & Vanderhye P.C.

(57) ABSTRACT

A compact load cell that simultaneously measures normal and shear forces in a load plane offset from a sensor plane by a distance h. The compact load cell comprises at least three force sensing elements (preferably four) arranged in the sensor plane about a point and spaced a distance d from the point. All force sensing elements may be spaced by the same distance or the distance may be different for one or more force sensing elements. Each force sensing element comprises a pressure sensor encased in a force transmission medium. A load plate is in contact with the force transmission medium and a load beam is connected at one end to the load plate above the point of the sensor plane and extends to the load plane. Forces acting in the load plane are transmitted to the sensor plane by the load beam and load plate. The forces are resolved to determine the normal and shear forces acting at the load plane. The compact load cell may be applied to determine forces acting on, for example, an unmanned aerial vehicle.

24 Claims, 5 Drawing Sheets

(56) References Cited

U.S. PATENT DOCUMENTS

| | | | | |
|---|---|---|---|---|
| 4,709,342 A * | 11/1987 | Hosoda | G01L 1/16 | 310/338 |
| 5,110,314 A * | 5/1992 | Fujihara | A63H 27/12 | 446/37 |
| 5,117,687 A * | 6/1992 | Gerardi | G01L 5/223 | 73/170.15 |
| 5,259,729 A * | 11/1993 | Fujihira | A63H 27/12 | 416/61 |
| 5,604,314 A | 2/1997 | Grahn | | |
| 5,867,808 A * | 2/1999 | Selker | G01L 5/162 | 338/2 |
| 6,003,390 A * | 12/1999 | Cousy | H03K 17/9643 | 310/338 |
| 6,188,331 B1 * | 2/2001 | Zee | G01B 7/004 | 33/123 |
| 6,779,400 B1 * | 8/2004 | Thelen | G01L 5/16 | 73/471 |
| 6,791,532 B2 * | 9/2004 | Hirano | G06F 3/0213 | 345/161 |
| 7,117,735 B2 * | 10/2006 | Shoemaker | G01F 1/661 | 73/170.01 |
| 7,219,561 B2 * | 5/2007 | Okada | G01L 5/165 | 73/862.043 |
| 7,441,442 B2 * | 10/2008 | Morgan | G01D 5/14 | 73/54.28 |
| 7,665,371 B2 * | 2/2010 | Mastinu | F16C 11/12 | 73/760 |
| 7,716,975 B2 * | 5/2010 | Rey | G01L 5/162 | 152/152.1 |
| 7,739,922 B2 * | 6/2010 | Inamori | G01L 5/223 | 73/862.044 |
| 7,772,657 B2 * | 8/2010 | Vaganov | G01L 1/044 | 257/415 |
| 7,852,191 B2 * | 12/2010 | Morimoto | G01L 5/161 | 338/2 |
| 7,938,028 B2 * | 5/2011 | Hirabayashi | G01L 1/26 | 73/754 |
| 8,152,440 B2 * | 4/2012 | Zheng | G01L 9/0058 | 415/2.1 |
| 8,156,816 B2 * | 4/2012 | Willner | G01L 19/0084 | 73/720 |
| 8,276,466 B2 * | 10/2012 | Kurtz | G01L 5/0009 | 73/862.041 |
| 8,350,345 B2 * | 1/2013 | Vaganov | G06F 3/0338 | 257/415 |
| 8,482,086 B2 * | 7/2013 | Shimoyama | B81B 7/04 | 257/414 |
| 8,601,885 B2 * | 12/2013 | Delapierre | G01L 1/148 | 73/862.041 |
| 8,826,747 B2 * | 9/2014 | Lee | G01L 5/161 | 73/862.046 |
| 8,845,290 B1 * | 9/2014 | Lugg | B64C 27/68 | 416/147 |
| 8,955,792 B2 * | 2/2015 | Schank | G01D 5/145 | 244/17.13 |
| 9,034,666 B2 * | 5/2015 | Vaganov | G01L 5/162 | 324/750.01 |
| 9,109,966 B2 * | 8/2015 | Duits | G01L 5/16 | |
| 9,171,965 B2 * | 10/2015 | Takenaka | H01L 29/1602 | |
| 9,200,969 B2 * | 12/2015 | Ueno | G01L 5/16 | |
| 9,205,561 B2 * | 12/2015 | Ikebe | B25J 9/1694 | |
| 9,261,423 B2 * | 2/2016 | Benfield | G01L 5/162 | |
| 9,599,993 B2 * | 3/2017 | Kumar | G05D 1/104 | |
| 9,625,333 B2 * | 4/2017 | Jentoft | G01L 5/16 | |
| 9,809,303 B2 * | 11/2017 | Schank | G01D 5/145 | |
| 9,829,401 B2 * | 11/2017 | McArthur | G01L 1/22 | |
| 9,914,535 B2 * | 3/2018 | Paulos | B64C 27/39 | |
| 10,023,323 B1 * | 7/2018 | Roberts | B64D 43/00 | |
| 10,054,504 B2 * | 8/2018 | Gouko | G01L 5/047 | |
| 10,124,888 B2 * | 11/2018 | Pounds | B64C 39/024 | |
| 10,377,478 B2 * | 8/2019 | Muren | B64C 27/72 | |
| 10,520,389 B2 * | 12/2019 | Brandon | G01M 9/08 | |
| 10,577,096 B2 * | 3/2020 | Roberts | B64C 29/0033 | |
| 10,597,154 B1 * | 3/2020 | Hoffberg | B64C 21/00 | |
| 10,604,245 B2 * | 3/2020 | Pantalone | B64C 27/463 | |
| 10,919,617 B2 * | 2/2021 | Griffin | B64C 13/16 | |
| 11,203,422 B2 * | 12/2021 | Buesing | B64C 27/605 | |
| 11,209,329 B2 * | 12/2021 | Chen | A61B 5/02108 | |
| 2008/0030482 A1 * | 2/2008 | Elwell | G06F 3/0414 | 345/173 |
| 2013/0239700 A1 | 9/2013 | Benfield et al. | | |
| 2019/0031341 A1 * | 1/2019 | Gomez Gutierrez | B64C 39/024 | |
| 2019/0217948 A1 * | 7/2019 | Pounds | B64C 11/00 | |

OTHER PUBLICATIONS

Written Opinion of the ISA for PCT/AU2017/051282, dated Feb. 23, 2018, 4 pages.

* cited by examiner

COMPACT LOAD CELLS

This application is the U.S. national phase of International Application No. PCT/AU2017/051282 filed 22 Nov. 2017, which designated the U.S. and claims priority to AU Patent Application No. 2016904834 filed 24 Nov. 2016, the entire contents of each of which are hereby incorporated by reference.

FIELD OF THE INVENTION

The present invention relates to the field of force sensing. More particularly, the invention relates to a contact force probe assembly able to resolve contact force in 3 or more degrees of freedom.

BACKGROUND TO THE INVENTION

In recent years force sensing devices have been developed based on barometric pressure transducers. One very recent example is described in United States patent publication number US2014/0260678 titled "Tactile Sensor". This patent application describes a tactile sensor formed from a pressure transducer encapsulated in an elastic material. The elastic material defines a contact surface of the tactile sensor and serves to transfer contact forces applied to the contact surface to the transducer. The tactile sensors described in the patent application are compact and lightweight (around 10 grams). The patent application proposes a number of applications of the tactile sensor including control of a robotic gripper, product stiffness testing in industrial automation, balance and levelling applications, haptics, and others.

Each of the sensors described in US2014/0260678 consists of a chamber surrounding a pressure transducer mounted on a printed circuit board. The chamber is filled with an elastic material that expands from an opening in the chamber to provide the contact surface. The pressure transducer is, for example, a MEMS (micro-electro-mechanical system) MPL115A2 absolute pressure sensor available from Freescale Semiconductor Inc in Austin, Tex., USA.

Even more recently a force sensing device has been described by Reeks et. Al. ("Angled Sensor Configuration Capable of Measuring Tri-Axial Forces for pHRI"; Christian Reeks, Marc G Carmichael, Dikia Liu, Kenneth J Waldron; 2016 IEEE International Conference on Robotics and Automation; Stockholm, Sweden, May 16-21, 2016) that uses an array of angled sensors to measure external force applied along each Cartesian axis (X, Y and Z). The force sensing device uses four barometric sensing devices laid out in a Maltese cross format and each angled at, preferably, 45 degrees with respect to an interaction surface. The four barometric sensing devices are laid out on a printed circuit board and potted in polyurethane rubber. As with the device described above, the barometric sensing device is formed with a chamber that has an opening that is filled with the polyurethane rubber to transmit contact force to the sensing device.

The known devices are limited in their application as each only measures a limited range of forces.

SUMMARY OF THE INVENTION

In one form, although it need not be the only or indeed the broadest form, the invention resides in a compact load cell that simultaneously measures normal and shear forces in a load plane offset from a sensor plane by a distance h, the compact load cell comprising:

at least three force sensing elements arranged in the sensor plane about a point and spaced a distance d from the point, each force sensing element comprising a pressure sensor encased in a force transmission medium;
a load plate in contact with the force transmission medium;
a load beam connected at one end to the load plate above the point of the sensor plane and extending to the load plane; wherein forces acting in the load plane are transmitted to the sensor plane by the load beam and load plate.

The sensor plane suitably comprises a printed circuit board and the force sensing elements are bonded and electrically connected to the printed circuit board. The printed circuit board suitably includes signal processing electronics.

The force sensing elements may be arranged uniformly around the point, for instance at the corners of an equilateral triangle centred on the point, or non-uniformly with each sensing element a different distance d from the point.

The force transmission medium is preferably polyurethane rubber and the load plate is suitably made from polymethylmethacrylate. The load plate is bonded to the force transmission medium by any suitable method, but most suitably by gluing.

The load beam may be a flexible rod that is fixed to the centre of the load plate, most conveniently by gluing. A suitable flexible rod is a carbon rod. Alternately the load beam may be a larger structure fixed to the whole load plate, or a substantial part of the load plate. In one form the load beam is a motor driving a rotor of a UAV. The axis of the rotor is aligned with the centre of the load plate so that forces acting at the rotor are transmitted to the sensor plane.

The compact load cell is suitably fixed to a reference plane. The reference plane may be a moving plane, such as the working surface of a tool, a gripping surface of a robot, an airframe of a UAV, or similar situations.

In another form the invention resides in an array of compact load cells attached to an object, each compact load cell being of the kind described above, and a processor that receives readings from each compact load cell and calculates thrust and velocity of the object. Suitably there are at least two compact load cells and each compact load cell has at least three force sensing elements. Preferably there are four compact load cells each with four sensor elements.

Suitably the object is a quadrotor UAV and there are four compact load cells each offset from the centre of mass of the quadrotor UAV. The processor suitably determines from the compact load cell measurements one or more of: pitch; yaw; roll; x-axis motion; y-axis motion; and z-axis motion.

In a yet further form the invention resides in a method of measuring normal and shear forces in a load plane offset from a sensor plane by a distance h including the steps of:
transmitting the normal and shear forces to a load plate of a compact load cell, the compact load cell comprising at least three force sensing elements arranged in the sensor plane about a point and spaced a distance d from the point, each force sensing element comprising a pressure sensor encased in a force transmission medium with the load plate in contact with the force transmission medium;
measuring the forces on each force sensing element; and
calculating the normal and shear forces in the load plane from the forces on each pressure sensing element, d and h.

In a still further form the invention resides in a method of determining thrust and velocity of a quadrotor UAV by:
arranging a compact load cell of the type described above between the airframe and each rotor;
determining normal and shear forces at each rotor;
calculating thrust and velocity of the UAV from the normal and shear forces.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
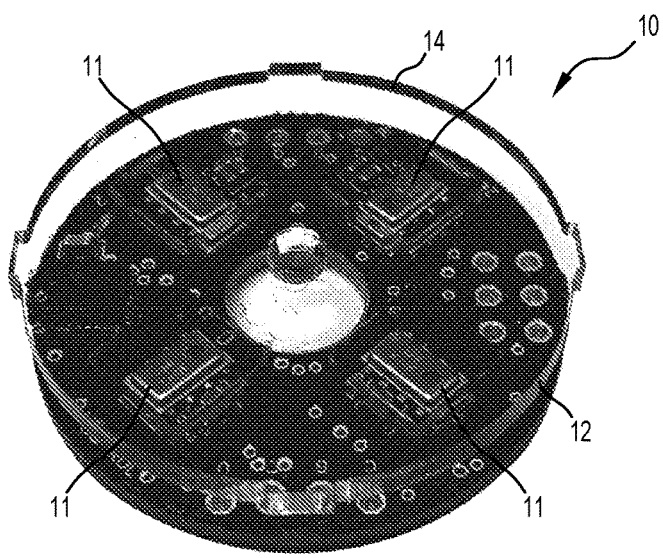
FIG. 1 shows a first embodiment of a load cell according to the invention.

Embodiments of the present invention reside primarily in a compact load cell and a method of making a compact load cell. Accordingly, the elements of the compact load cell have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Figure 2:
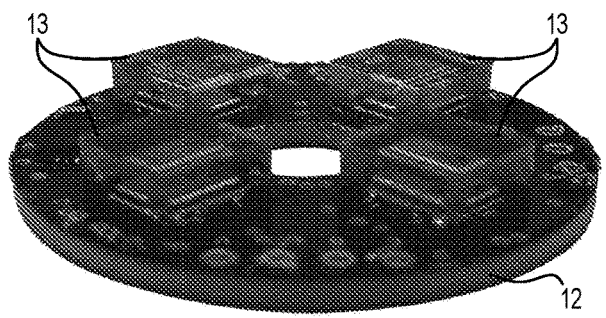
FIG. 2 shows another view of the load cell of FIG. 1.

Referring to FIG. 1 there is shown a compact load cell 10 according to a first embodiment. The compact load cell 10 consists of four MEMS pressure sensors 11 mounted on a printed circuit board (PCB) 12 in a cross configuration. Each pressure sensor 11 is potted in force transmission medium 13, such as polyurethane rubber (PUR). The polyurethane rubber is seen most clearly in FIG. 2. The PCB 12 includes a microcontroller and an interface connection which is conveniently a USB connection. The PCB is described in greater detail below. A load plate 14 is affixed, suitably glued, to the top of the PUR 13. The load plate 14 has been removed in FIG. 2 so as to make the PUR 13 more visible.

The inventors have found that polyurethane rubber is a particularly suitable force transmission medium but other materials may also be used. For instance, a silicone rubber material may also be used. The requirement is that the force transmission medium transmits a force applied to a contact surface from the contact surface to the pressure sensor 11. Any material that is vitreous and an electrical insulator should be suitable.

Furthermore, the physical properties of the force transmission medium may be selected for specific applications. A soft force transmission medium may provide a degree of damping that would be desirable in certain applications. A hard force transmission medium may transmit a stronger signal that will be desirable in other applications.

The MEMS pressure sensors 11 are suitably MS5611 barometric pressure sensors available from MEAS Switzerland Sarl. The pressure sensors are supplied in a stainless steel can as seen in FIG. 1 but the inventors have found that greater sensitivity is achieved if the can is removed, as described below. An alternate sensor is an MPL115A2 available from Freescale Semiconductor Inc in Austin, Tex., USA but the inventors have found that the MS5611 is preferred. Another suitable sensor is BMP280 available from Bosch GmbH. Other barometric pressure sensors will also be suitable.

Figure 3:
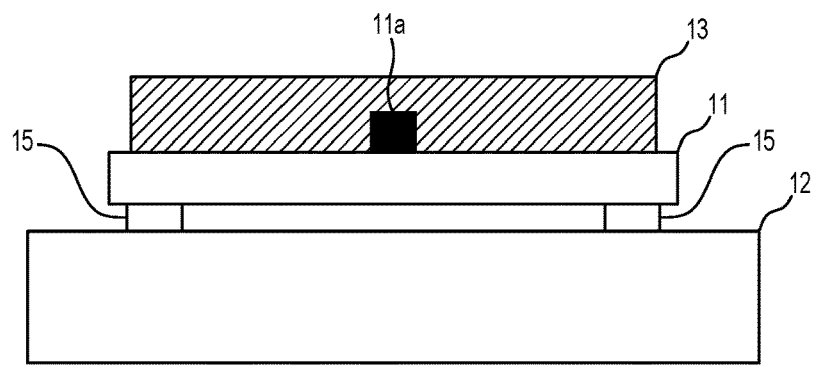
FIG. 3 is a sketch of one sensor of the load cell of FIG. 1.

The arrangement of each individual sensor 11 is shown schematically in FIG. 3. Each sensor 11 is attached to the PCB by soldering pin-headers 15 to the PCB 12. The pin-headers also act to transfer data and power between the PCB and the sensor chip 11. The active element 11a of the sensor 11 is located toward one end of the sensor 11 and uncovered by removing the stainless steel can that is supplied from the manufacturer. The force transmission medium 13 is moulded over the active element 11a. The data output from each sensor element is a 12 bit pressure sensor reading.

Figure 4:
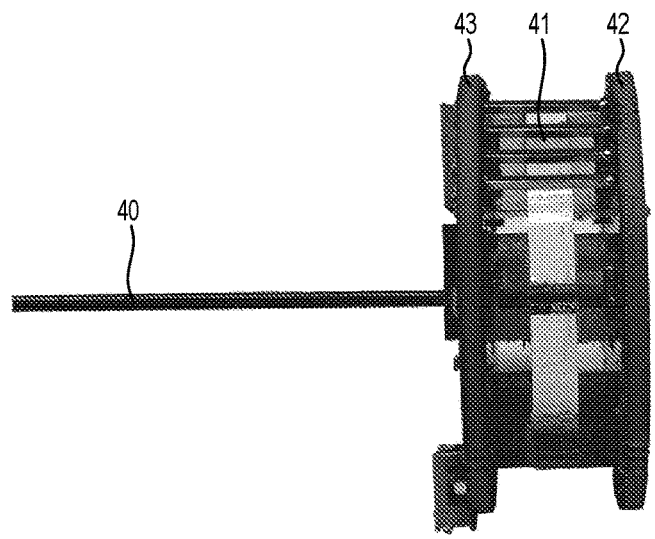
FIG. 4 shows a contact probe employing the load cell of FIG. 1.
Figure 5:
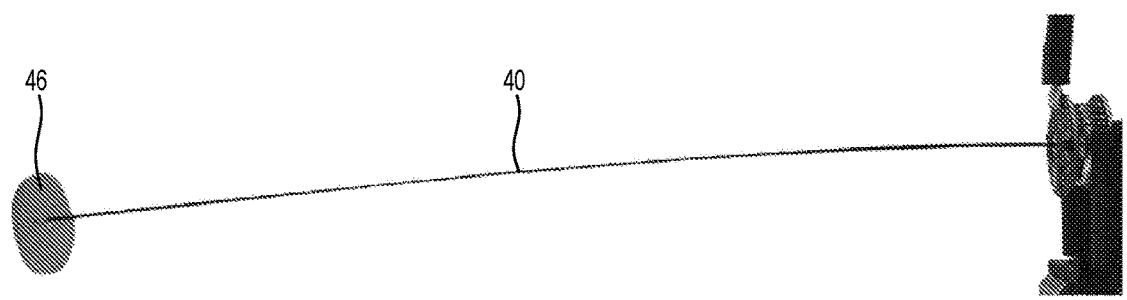
FIG. 5 shows the contact probe of FIG. 4 displaced by a load.
Figure 6:
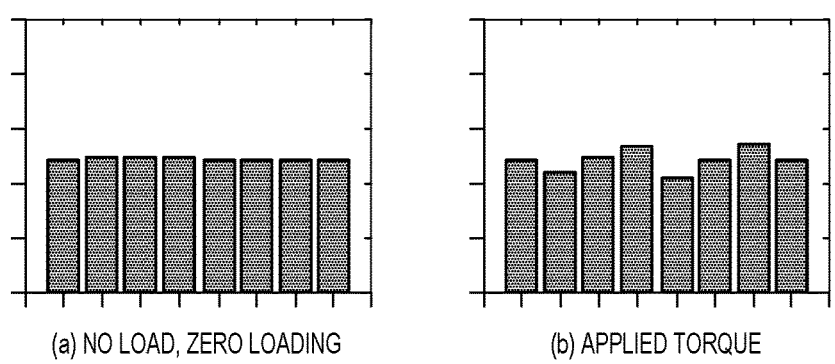
FIG. 6 shows the output signal from the contact probe of FIG. 4 and FIG. 5.

An application of the load cell 10 is shown in FIG. 4. A flexible carbon fibre rod 40 is attached to the centre of a load plate 41 between a pair of load cells 42, 43. The load cells 42, 43 have an identical construction to the load cell 10 described above. With no load applied to the fibre rod 40 the pressure readings from the eight sensors are identical, as seen in FIG. 6(a). When a load 46 is applied to the end of the fibre 40, as shown in FIG. 5, the pressure readings change in the manner shown in FIG. 6(b). It is evident that the first four readings (corresponding to sensors on the load cell 42) are simply the mirror of the second four readings (corresponding to sensors on the load cell 43). The second load cell is therefore not necessary in some applications but in other applications it allows for a wider range of push/pull measurements.

Another application of the load cell is to directly sense thrust and velocity of an unmanned aerial vehicle (UAV), in particular a quadrotor vehicle. Micro UAV flight requires accurate estimates of aircraft position, velocity and applied thrust in order to track trajectories with precision. However, the thrust produced by the rotors of a quadrotor is variable and may include undesired, or unknown, non-axial components of force. Local winds, height above the ground and the manoeuvres of the aircraft may affect the amount of thrust produced. Contemporary high-performance control typically employs high-resolution, precision motion capture and onboard inertial measurement units (IMUs) to localise the aircraft in space and correctly align the output force of the aircraft in the desired direction and correct for tracking errors.

Outside of instrumented spaces, available tracking precision degrades due to the limitations of conventional systems such as GPS, dynamic airspeed sensors and optical flow. These sensors are ineffective at low speeds, small movement ranges or, in the case of optical flow, far from ground. Likewise, intrinsic sensors such as MEMs accelerometers are insufficient due to their noise and high drift. A better approach is to directly measure forces transmitted from a rotor to the airframe of a micro UAV. This provides both an immediate measurement of the forces entering the rigid dynamics of the aircraft, such that a fast control loop may be applied to regulate body forces, as well as information about the effects of velocity observed at each rotor. By employing a model of rotor flapping and induced drag force dynamics, measurements of the lateral components of rotor thrust may be used to infer the local aerodynamic flow-field at the rotor.

An array of sensors is mounted on each rotor of a micro quadrotor, to provide an aggregate estimate of aircraft thrust and velocity. The motions of a rotor mounted some offset distance from the centre of mass of a quadrotor allows cross-coupling forces due to pitch, roll and yaw velocities to be added to those of translational velocity. With two or more rotors, sufficient measurements are available to (in principle) extract estimates of the full 6-DOF velocity vector.

An arrangement of four pressure sensors in a square allows for independent measurement of the torques along each diagonal by taking the difference of two opposite sensor readings. The thrust produced by the motor can be computed by taking the sum of all four scaled sensor readings.

The force $F_n$ on each sensor element approximated as a simple spring is given by:

$$F_n = k\bar{p}_n \quad (1)$$

where k is the sensor coefficient and $\bar{p}_n$ is the tared sensor reading under gauge load given by $\bar{p}_n = p_n - p_{n0}$.

The total vertical force $F_z$ measured by the die sensor array is given by:

$$F_z = \Sigma F_n \quad (2)$$

$$F_z = k(\bar{p}_1 + \bar{p}_2 + \bar{p}_3 + \bar{p}_4) \quad (3)$$

The torques $\tau_x$ and $\tau_y$ measured by the motor force sensor are given by:

$$\tau_x = kd(\bar{p}_4 - \bar{p}_3) \quad (4)$$

$$\tau_y = kd(\bar{p}_2 - \bar{p}_4) \quad (5)$$

where d is the horizontal distance of the sensing elements from the central of the motor force sensor.

Figure 7:
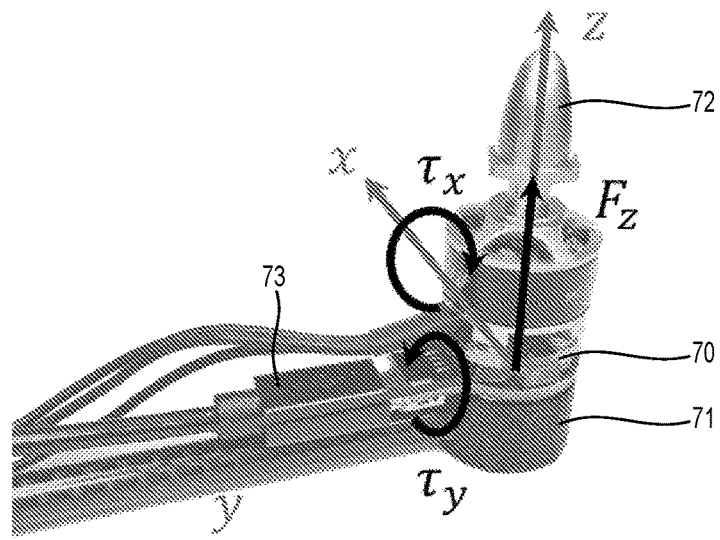
FIG. 7 shows a quadrotor employing a load cell to measure thrust and velocity.

The sensor coefficient was determined by loading the sensor with a series of known masses and found in the specific embodiment of FIG. 7 to be k=3058 units/N.

Figure 8:
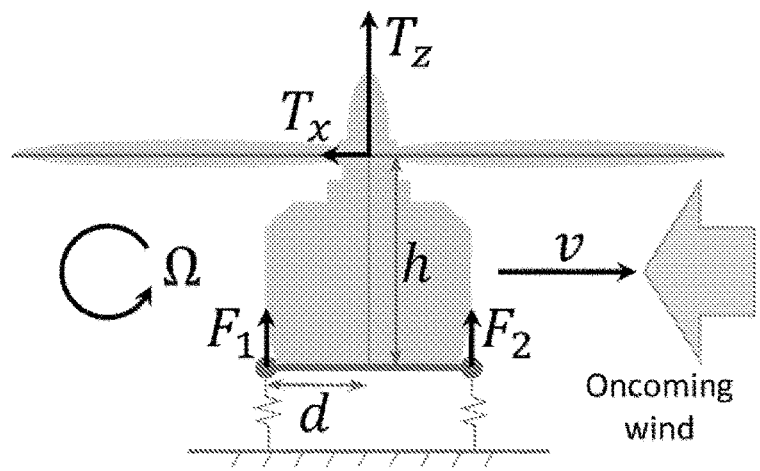
FIG. 8 shows the forces on the quadrotor of FIG. 7.

The arrangement for measuring normal force $F_z$ and torques $\tau_x$ and $\tau_y$ is shown in FIG. 7 together with the x, y, z reference axes. The load cell 70 is mounted on the airframe 71, which is a reference plane, and the rotor 72 is mounted on the load cell. The load cell has a USB connection 73 for data communication with an onboard microcontroller as described below. The point of load is vertically offset from the load cell by a distance h as shown in FIG. 8 and acts through the centre of the load cell so it is offset horizontally by distance d. It will be appreciated that "horizontal" and "vertical" are used here as relative terms and the invention is in no way limited to these specific orientations.

As the rotor applies force to the airframe via the motor, the changing pressure field over the load plate produces collective and differential measurements across the sensor elements from which the axial and transverse forces may be derived. The offset between the rotor centre and load plate surface allows pure torques to be coupled into moments and measured.

The free body diagram of a simplified planar model comprised of two sensing elements is considered as shown in FIG. 8. The force sensors are compressible and allow small deflections under load.

The vertical and horizontal components of thrust are:

$$T_x = (F_1 - F_2)\frac{d}{h} \quad (6)$$

$$T_y = (F_3 - F_4)\frac{d}{h} \quad (7)$$

$$T_z = F_1 + F_2 + F_3 + F_4 \quad (8)$$

where $F_i$ is the force measured by the $i^{th}$ sensor element.

The forces and velocities of a quadrotor measured onboard will naturally be expressed in the body-fixed frame, $A=\{e_1, e_2, e_3\}$ where $e_1$ is aligned with the front of the craft. Vector v is the translational velocity of frame A and $\Omega$ is angular velocity of frame A, relative to the inertial frame, expressed in A.

A. Single Rotor Forces and Torques

When a rotor translates perpendicular to its axis of rotation, unbalanced aerodynamic forces due to blade flapping and induced drag give rise to horizontal components of thrust opposing the direction of motion. When a quadrotor pitches or rolls, the instantaneous gyroscopic stability of its rotors causes them to lag behind the motion of the airframe. This produces effective blade flapping that results in a local transverse thrust component in the body-fixed frame.

Combining these effects produces a 6-DOF single rotor force model for multirotors:

$$T = -k\omega^2(I - (Q_1 v_x e_3)_x - (Q_2 \Omega)_x)e_3 \quad (9)$$

where T is the rotor force, k is a rotor thrust constant, $\omega$ is the rotor velocity, I is the 3×3 identity matrix, v and $\Omega$ are the aircraft body-fixed translational and rotational velocities respectively. Matrices $Q_1$ and $Q_2$ are:

$$Q_1 = q_1(e_1 \ e_2 \ 0) \quad (10)$$

$$Q_2 = q_2(e_1 \ e_2 \ 0) + \frac{1}{\omega}(e_1 \ e_2 \ 0) \quad (11)$$

for $q_i$ and $q_2$, constant translation and rotation lateral force parameters of the rotor, respectively. Here X is the skew-symmetric matrix operator.

Conversely, when a rotor translates axially, the changing local angle of attack of air passing over the rotor blades results in an increase or decrease in thrust, opposing the direction of motion (known as rotor inflow damping):

$$T \cdot e_3 = -k\omega^2(I - c_z v \cdot e_3) \quad (12)$$

where $c_z$ is a damping constant given by:

$$C_z = \frac{1}{\alpha \omega R} \quad (13)$$

where $\alpha$ is the geometric rotor angle of attack and R is the rotor radius.

Thus, the 3-DOF translational velocities and roll and pitch rotational velocities produce forces measurable at the rotor head. For a single rotor, pitch- and roll-induced forces are indistinguishable from translation-induced forces.

It will be appreciated by persons skilled in the field that the above description relates to a linearised model for estimating force-torque mapping. Other models, such as a quadratic estimation, may be more appropriate in other applications. The invention is not limited to any specific method of calculating rotor parameters from the measured forces.

B. Collective Rotor Motion

The multiple rotors of a quadrotor provide additional mechanics that can be used for velocity estimation. The displacement between a quadrotor's rotors and its centre of mass result in coupled translations of the rotors due to roll, pitch and yaw velocities. Equation (9) can be expanded to give the change in measured thrust due to motion:

$$\Delta T_i = -kw^2[-K_1 v - K_{2i}\Omega] \quad (14)$$

$$\begin{bmatrix} v \\ \Omega \end{bmatrix} = (P)^{-1} \begin{bmatrix} \Delta T_1 \\ \Delta T_2 \\ \Delta T_3 \\ \Delta T_4 \end{bmatrix}$$

where $T_i$ is the thrust of the $i^{th}$ rotor, and $K_1$ and $K_{2i}$ are augmented coupling matrices for the $i^{th}$ rotor:

$$K_1 = Q_1 + (00 c_z e_3) \quad (15)$$

$$K_{2i} = (K_1 d_{ix} - Q_2) \quad (16)$$

where $d_i$ is the rotor offset from the centre of mass.

The mapping between motions and thrust outputs can thus be written for the whole aircraft:

$$\begin{bmatrix} \Delta T_1 \\ \Delta T_2 \\ \Delta T_3 \\ \Delta T_4 \end{bmatrix} = \begin{bmatrix} K_1 K_{21} \\ K_2 K_{22} \\ K_3 K_{23} \\ K_4 K_{24} \end{bmatrix} \begin{bmatrix} v \\ \Omega \end{bmatrix} \quad (17)$$

where the combined 12×6 coupling mapping matrix is denoted P. By exploiting this coupling, the full 6-DOF velocity vector of the aircraft may be recovered. For a conventional '+' quadrotor with four rotors of approximately equal rotor speed, spaced equal distance d from and h above the centre of mass, P is:

$$P = \begin{bmatrix} q_1 & 0 & 0 & -q_2 & -q_1 h - 1/\omega & 0 \\ 0 & q_1 & 0 & -q_1 h - 1/\omega & -q_1 & q_1 d \\ 0 & 0 & c_z & 0 & -c_z d & 0 \\ q_1 & 0 & 0 & -q_2 & -q_1 h - 1/\omega & -q_1 d \\ 0 & q_1 & 0 & -q_1 h - 1/\omega & -q_1 & 0 \\ 0 & 0 & c_z & c_z d & 0 & 0 \\ q_1 & 0 & 0 & -q_2 & -q_1 h - 1/\omega & 0 \\ 0 & q_1 & 0 & -q_1 h - 1/\omega & -q_1 & -q_1 d \\ 0 & 0 & c_z & 0 & c_z d & 0 \\ q_1 & 0 & 0 & -q_2 & -q_1 h - 1/\omega & q_1 d \\ 0 & q_1 & 0 & -q_1 h - 1/\omega & -q_1 & 0 \\ 0 & 0 & c_z & -c_z d & 0 & 0 \end{bmatrix} \quad (18)$$

For non-zero values of d and $\omega$, P is rank 6, and it's left inverse may be readily computed such that:

$$(P)^{-1} = \begin{bmatrix} \frac{1}{4q_1} & 0 & -\frac{1}{2c_z dq_1 \omega} & \frac{1}{4q_1} & 0 & \frac{q_2}{2c_z dq_1} & \frac{1}{4q_1} & 0 & \frac{1}{2c_z dq_1 \omega} & \frac{1}{4q_1} & 0 & -\frac{q_2}{2c_z dq_1} \\ 0 & \frac{1}{4q_1} & -\frac{1}{2c_z d} & 0 & \frac{1}{4q_1} & \frac{1}{2c_z dq_1 \omega} & 0 & \frac{1}{4q_1} & \frac{1}{2c_z d} & 0 & \frac{1}{4q_1} & \frac{1}{2c_z dq_1 \omega} \\ 0 & 0 & \frac{1}{2c_z dq_1 \omega} & 0 & 0 & \frac{1}{2c_z dq_1 \omega} & 0 & 0 & \frac{1}{2c_z dq_1 \omega} & 0 & 0 & \frac{1}{2c_z dq_1 \omega} \\ 0 & 0 & 0 & 0 & 0 & \frac{1}{2c_z d} & 0 & 0 & 0 & 0 & 0 & -\frac{1}{2c_z d} \\ 0 & 0 & -\frac{1}{2c_z d} & 0 & 0 & 0 & 0 & \frac{1}{2c_z d} & 0 & 0 & 0 & 0 \\ 0 & \frac{1}{4dq_1} & 0 & -\frac{1}{4dq_1} & 0 & 0 & 0 & -\frac{1}{4dq_1} & 0 & \frac{1}{4dq_1} & 0 & 0 \end{bmatrix} \quad (19)$$

Note that the lateral velocity components are effectively the mean lateral force, scaled by $1/q_1$, as the other contributing components are very small. As a consequence, however, the vertical velocity and rotational velocities sensitivities are also expected to be small, which results in less sensitive tracking. As the IMU gyros of the aircraft also provide useful estimates of velocities, so these could additionally be fused with the force-derived estimates to augment the measurement.

Figure 9:
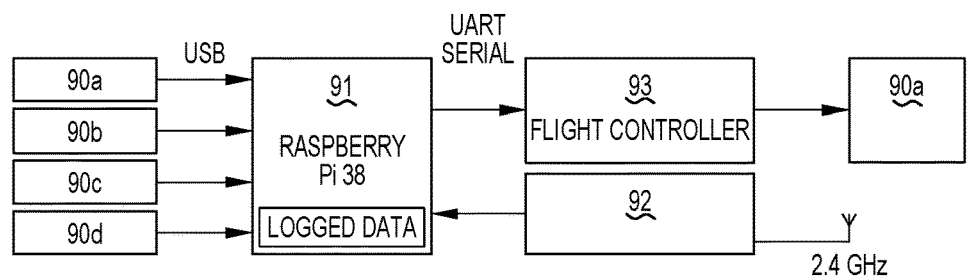
FIG. 9 shows the system of control for the application of FIG. 7.

Referring to FIG. 9, the arrangement for collecting data for the above equations is shown. A load cell (90 $a$-$d$) is associated with each of the rotors and connected by USB to a microcontroller 91. Control signals for directing flight of the UAV are provided through a radio receiver 92 to the microcontroller 91. The processed data from the sensors is combined with the flight instructions to output flight control signals to a flight controller 93 and hence to the electronic speed controllers (ESCs) of the electric motors of the rotors.

Figure 10:
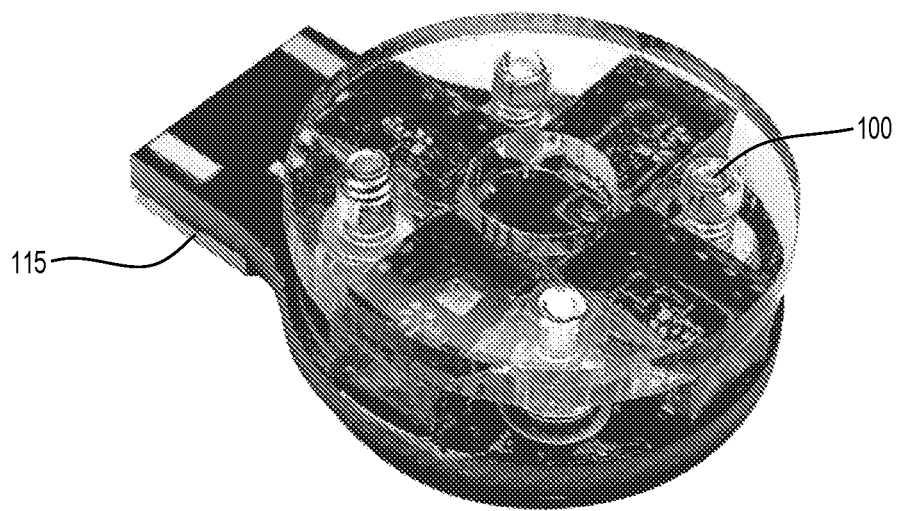
FIG. 10 shows a load cell employed in the application of FIG. 7.
Figure 11:
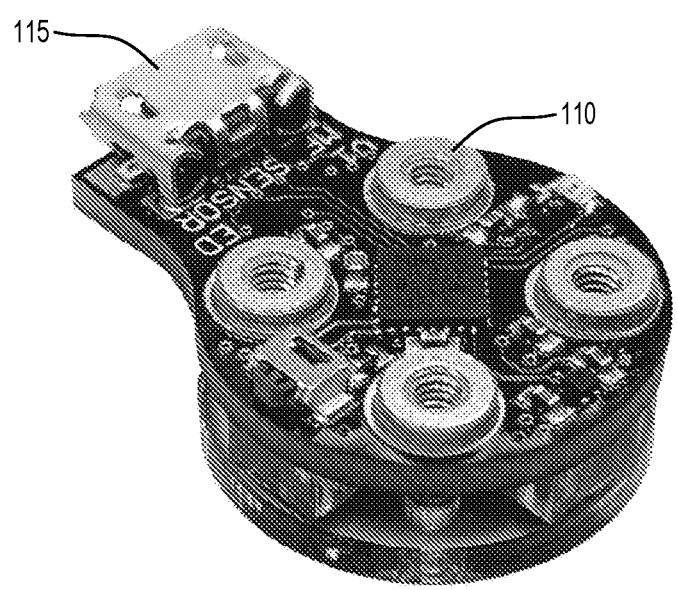
FIG. 11 shows a reverse view of the load cell of FIG. 10.

The load cells of FIG. 7 differ from the load cell of FIG. 1 by incorporating four threaded stand-offs 110 for attaching the load cell to the air frame and four screws 100 for attaching the rotor to the load cell. These are shown clearly in FIG. 10 and FIG. 11. FIG. 10 also clearly shows the MEMS sensor with the stainless steel cap removed. With the USB connector 115 the load cell weighs about 3 g.

Figure 12:
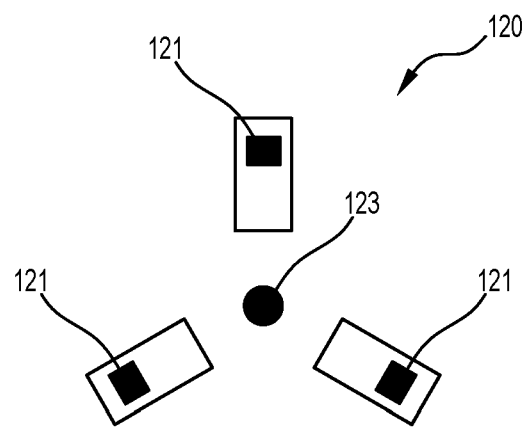
FIG. 12 is a schematic of an alternate load cell configuration.

The above two embodiments demonstrate the application of the invention to a contact probe and measurement of thrust and velocity of a UAV. In each case the compact load cell is constructed with four MEMS sensors. A minimum of three sensors in a triangle, as shown in FIG. 12, are required to measure both lateral forces and vertical force. In addition, reconfiguration of the sensors as shown in FIG. 13 to vary the distance d can provide other advantages.

It is also possible to use the configurations described above to measure multiple effects. For instance, the configuration described for controlling UAV flight may also be used for obstacle detection. If the UAV approaches an obstacle the air flow around the rotors is affected in a measurable way. The variation in air flow is manifest in the readings from the sensor array and so can be used for obstacle detection.

Referring specifically to FIG. 12, there is shown a load call 120 with three sensing elements 121. Each sensing element 121 is made a chip 122 which is open (the supplied stainless can is removed as described previously). The sensing elements are potted in PUR as described previously and a load plate is attached (not shown). A load beam 123 extends on an axis from the central point.

Figure 13:
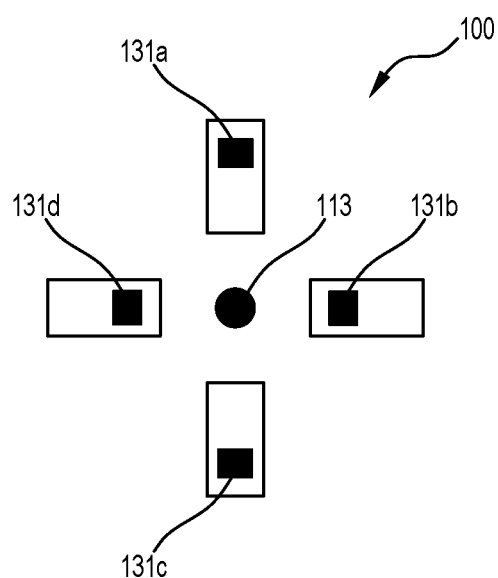
FIG. 13 is a further alternate load cell configuration.

Referring specifically to FIG. 13, there is shown a load call 130 with four sensing elements 131. Each sensing element 131 has the same structure as previously described, is potted in PUR a load plate is attached. A load beam extends on an axis from the central point 133. The sensing elements 131a and 131c are positioned at a different distance d from the central point 133 than the sensing elements 131b and 131d.

The compact load cells can be used in other applications. For instance, a load cell can be embodied in the heel of a shoe with a contact probe extending towards the ground. During gait the measured torques can be used for analysis of heel plant and foot impact. The compact load cell could be attached to one side of a joint with the load beam extending to the other side of the joint. In this application the load cell would measure relative normal and shear forces between the arms of the joint. Another application is to fix a compact load cell near the working face of a machine tool and use a feedback loop to control the normal and sheer forces that the tool applies to the work. In this configuration feedback is obtainable at >1 KHz, thereby allowing rapid change and high precision. This may be particularly useful for automated surgical tools since the devices can be easily sterilised.

Although the compact load cell has been described in terms of a MEMS pressure sensors arranged a PCB, it will be appreciated that the invention need not be constructed in this specific manner. The inventors envisage that the compact load cell may be embodied as a single-die MEMS force-torque sensor for measuring macroscopic forces via a mechanical structure consisting of levers, linkages and networked mechanical components fabricated on layers of silicon. In this embodiment the devices employ one or more capacitive, inductive or resistive MEMs force measurement elements in conjunction with one or more transmission elements that scale and redirect the force directed on a load point, such that the transmitted force produces motion at a location and in a dynamic range suitable to be measured by the MEMs sensor. A combination of several such transmissions, collectively or as a subsystem in a repeating network, work together to convert applied torques into measurable forces, divide the applied force evenly or unevenly between two or more sensors, or partition applied force across sensors by dynamic range. In this way, very large forces may be measured accurately by applying most of a force to a large, insensitive sensor with wide dynamic range, and applying a small amount of force to a small sensor with great precision, the result of these measurements are then combined to produce an accurate result.

The single-die MEMS force-torque sensor has multiple compartments that are mechanically and pressure wise isolated from each other to independently measure forces and there is a transmission element that distributes the external force into these compartments. A network of linkages between these cells may form part of a meta-material structure.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A force sensing apparatus for measuring forces in a load plane vertically offset from a sensor plane by a distance h, the force sensing apparatus comprising:
    at least one compact load cell comprising:
        at least three force sensing elements arranged in the sensor plane about a point and horizontally spaced a distance d from the point, each force sensing element comprising a pressure sensor encased in a force transmission medium such that the at least three force sensing elements form an array of pressure sensors;
        a load plate in contact with the force transmission medium;
        a load beam having a first end and a second end, the first end connected to the load plate and the second end extending axially from the point to the load plane;
    at least one rotor connected to the second end of the load beam located in the load plane; and
    wherein the load beam defines a motor shaft configured to drive the rotor such that forces acting on the rotor are transmitted to the sensor plane via the motor shaft, and a changing pressure field over the load plate produces measurements across the sensor elements from which axial and transverse forces applied to the rotor may be derived to calculate a local aerodynamic flow-field at the rotor;
    wherein the measurements obtained by the sensor elements include vertical and lateral components of force applied to the rotor; and
    wherein the force transmission medium is selected according to a desired degree of damping.

2. The force sensing apparatus of claim 1, wherein the force sensing elements are arranged uniformly around the point.

3. The force sensing apparatus of claim 1, wherein the force sensing elements are arranged non-uniformly with each sensing element a different distance d from the point.

4. The force sensing apparatus of claim 1, wherein the sensor plane comprises a printed circuit board and the force sensing elements are bonded and electrically connected to the printed circuit board.

5. The force sensing apparatus of claim 4, wherein the printed circuit board suitably includes signal processing electronics.

6. The force sensing apparatus of claim 1, wherein the sensor plane comprises a single-die MEMS force-torque sensor.

7. The force sensing apparatus of claim 1, wherein the force transmission medium is polyurethane rubber.

8. The force sensing apparatus of claim 1, wherein the load plate is made from polymethylmethacrylate.

9. The force sensing apparatus of claim 1, wherein the load plate is bonded to the force transmission medium.

10. The force sensing apparatus of claim 9, wherein the bonding is by gluing.

11. The force sensing apparatus of claim 1, wherein the motor shaft is flexible and is fixed to the centre of the load plate.

12. The force sensing apparatus of claim 11, wherein the fixing is by gluing.

13. The force sensing apparatus of claim 11, wherein the motor shaft is made of carbon fibre.

14. The force sensing apparatus of claim 1, wherein the load beam is fixed to the whole load plate, or a substantial part of the load plate.

15. The force sensing apparatus of claim 1, wherein an axis of the rotor is aligned with the centre of the load plate.

16. The force sensing apparatus of claim 1, wherein the force sensing apparatus is fixed to a reference plane.

17. The force sensing apparatus of claim 16, wherein the reference plane is a moving plane.

18. The force sensing apparatus of claim 17, wherein the reference plane is an airframe of a Unmanned Aerial Vehicle (UAV).

19. The force sensing apparatus of claim 1, further comprising an array of compact load cells and an array of rotors, wherein each compact load cell is attached to a vehicle and connected to a rotor of the vehicle.

20. A system for measuring forces on a vehicle, the system comprising:
   the force sensing apparatus according to claim 19; and
   a processor that receives the measurements from each array of pressure sensors of each compact load cell and calculates an aggregate thrust and an aggregate velocity of the vehicle by summing the measurements obtained from all scaled sensor readings of the compact load cells.

21. The system of claim 20, wherein the force sensing apparatus comprises two compact load cells and two rotors.

22. The system of claim 20, wherein the force sensing apparatus comprises four compact load cells and four rotors, each compact load cell comprising four force sensing elements.

23. The system of claim 20, wherein the vehicle is a quadrotor Unmanned Aerial Vehicle (UAV) and there are four compact load cells and four rotors each offset from the center of mass of the quadrotor UAV.

24. The system of claim 23, wherein the processor determines from the compact load cell measurements one or more of: pitch; yaw; roll; x-axis motion; y-axis motion; and z-axis motion at the rotors.

* * * * *